Nov. 6, 1962 E. A. SANFORD ET AL 3,062,685
CHEMICAL PROCESSING EQUIPMENT
Filed June 14, 1954 4 Sheets-Sheet 2
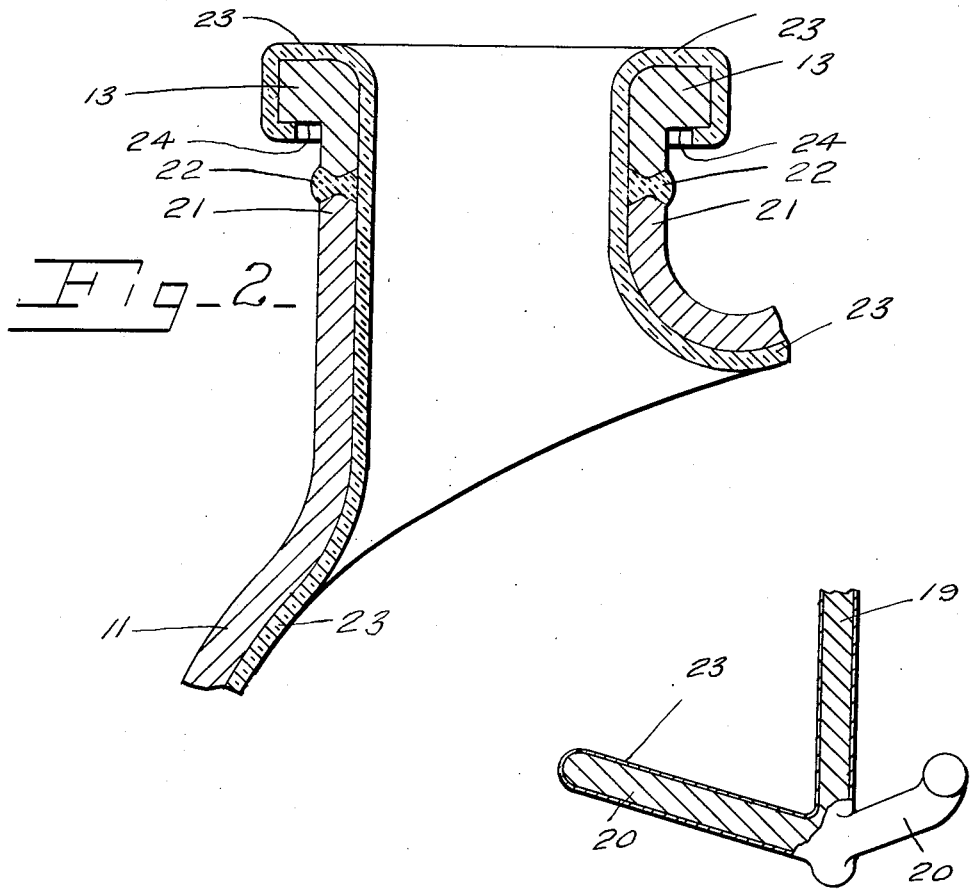
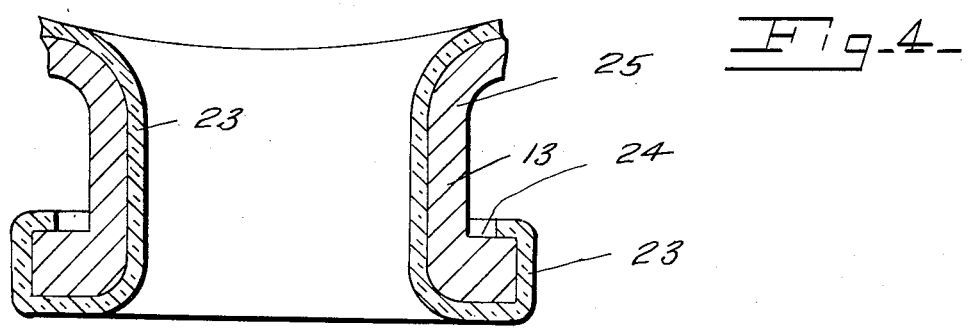
INVENTORS
Elbert A. Sanford and Goug Jen Su
BY
John P. Murphy
ATTORNEY.

INVENTORS
Elbert A. Sanford and
Goug Jen Su
BY
John P. Murphy
ATTORNEY.

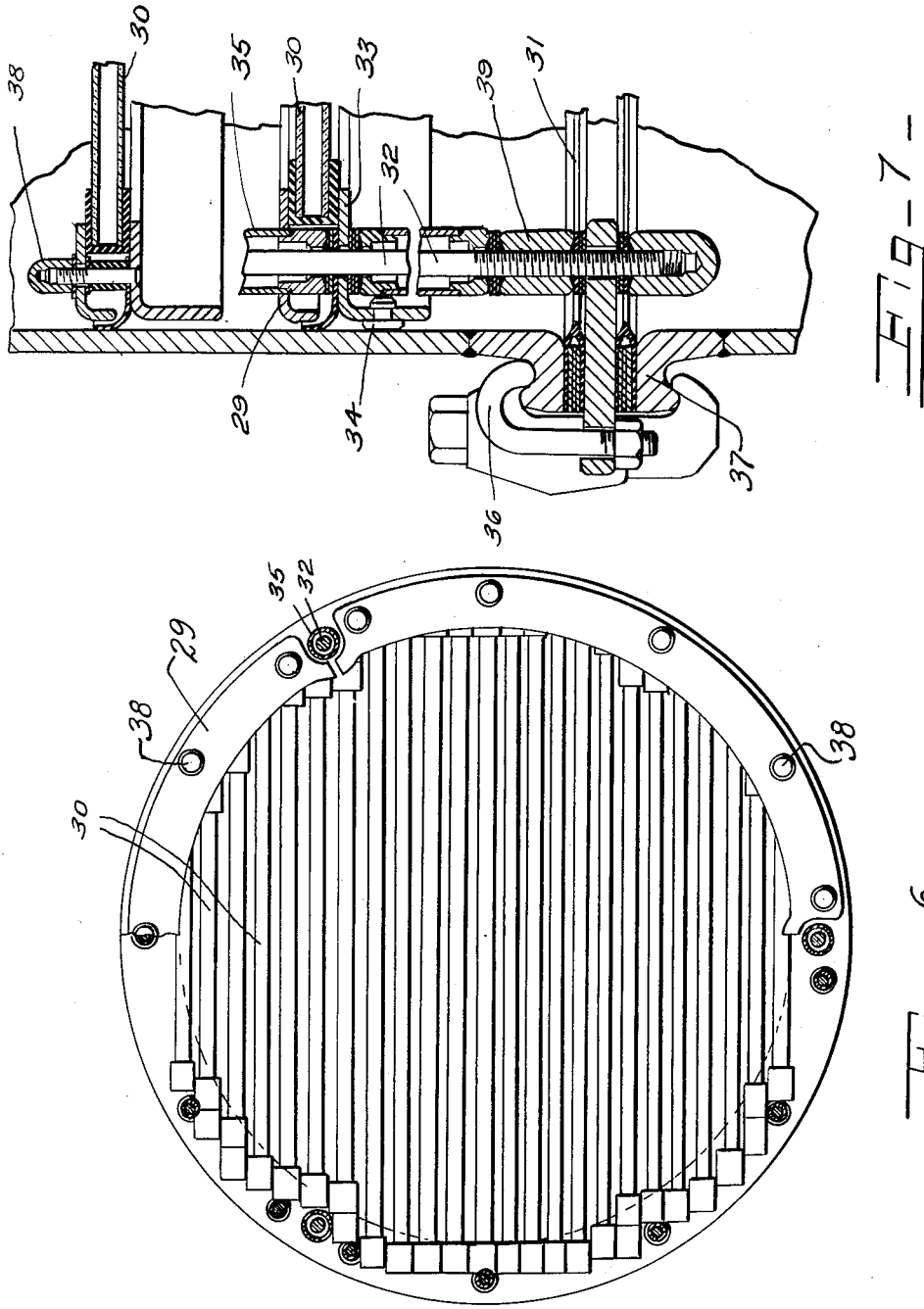

United States Patent Office 3,062,685
Patented Nov. 6, 1962

3,062,685
CHEMICAL PROCESSING EQUIPMENT
Elbert A. Sanford and Gouq Jen Su, Rochester, N.Y., assignors to Pfaudler Permutit Inc., Monroe County, N.Y., a corporation of New York
Filed June 14, 1954, Ser. No. 436,625
2 Claims. (Cl. 117—129)

This invention relates to corrosion-resistant material, and in particular, to glassed metals. Glass lined steel equipment is widely used in the chemical and pharmaceutical industries for the processing and storage of highly corrosive liquids. The versatility of this equipment to a wide range of corrosive materials is well known.

In general, glass has been found to be a highly desirable corrosion-resistant material which possesses the quality of almost perfect resistance to acids of all strengths, at a wide range of temperatures. In the chemical process industries, glass-lined steel equipment has been widely used because of its excellent corrosion resistance, its durability and its flexibility and economy. The same reasons that have made glass universally desirable for laboratory equipment have made the glassed steel equipment desirable for production uses, whether under pressure or vacuum, or normal atmospheric pressure.

Various glasses have been developed for specific purposes, and a glassed steel has been developed with improved resistance to alkaline solutions, while at the same time its resistance to acids has been maintained. Thus the strength characteristics of steel and the corrosion-resistant characteristics of glass are brought together to form a strong, highly resistant material.

A glassed metal system consists of two parts; first, the vitreous glass coating or lining, and second, the base metal to which the glass is fused. While glassed steel has been an accepted material of construction in many industrial processes, it has many limitations.

One of the limitations of glass lined equipment has been its tendency towards spontaneous chipping or spalling when the glass was applied to sharp convex surfaces. A second limitation has been the fact that acid solutions, reacting with the surface of the steel on the outside of the vessel, have produced hydrogen in atomic form which penetrates through the steel wall and causes the glass to spall off on the inside of the vessel.

Chemical process equipment with glass enamel surfaces has proven highly effective in resisting corrosion, but extension of such glass enameling to the container connection portions, such as fittings, flanges and collars for openings, and the like, has presented difficult problems. The glass enamel lining the engaging and seating surfaces of such connections has tended to become cracked and chipped by the mechanical stress and impact to which such connecting portions and surfaces are subjected.

Process equipment has also been made with surfaces of stainless steel or other corrosion-resisting metal alloys, and while such equipment is not subject to the cracking and chipping of the engaging and seating surfaces of the connections, it has not heretofore been possible to enamel or coat with glass such metal alloys to form a continuous enameled surface upon all parts of the process equipment which come in contact with corrosive materials and to coat those surfaces which are subjected to the greatest mechanical stresses, and impact, and corrosion.

An object of the present invention is to provide chemical process equipment of the general glass described having the corrosion resisting advantages of glass enameled inner or containing surfaces, combined with the advantages of the connecting portions having engaging and seating surfaces formed of corrosion-resistant metal which is not subject to cracking or chipping by mechanical stresses, or impacts, and which is continuously coated along the inner or containing surfaces with glass enamel.

Large, heavy glass lined jacketed reactors usually contain an outlet nozzle in the bottom and several inlet nozzles in the top head to which are attached valves, pipes, etc. In the tightening of these gasketed flanged joints the glass is sometimes fractured, exposing the steel base metal which is then susceptible to corrosive attack by the contents of the vessel.

It has been found that if these flanged nozzles are made of a suitable high alloy base metal, for example Hastelloy F or Hastelloy X, these vulnerable sections of the equipment will stand a great deal more torsion stress, or impact, before the glass breaks. If the glass is broken, or if seepage of an acid solution occurs because of leakage at a gasketed joint, the glass does not chip back because of the fact that hydrogen does not, diffuse through this high alloy base metal.

There is also a great need in the chemical industry for small high pressure autoclaves for laboratory or pilot plant use which are capable of operating under extremely corrosive conditions, for example with a highly corrosive acid at temperatures in excess of 400° F.

The fact that these high alloys have excellent strength at high temperatures and a slow rate of surface oxidation when heated in air is very advantageous. These properties permits the used of refractory glasses which could not be used to line a large vessel made of low carbon steel, but which can be fused very satisfactorily to a similar unit made of the alloy base metal.

It has been found, also, that it is possible to apply an acid resistant glass coating to very sharp convex radii without having the glass chip off. There are several reasons for these improved results with alloy base metals as compared with mild steel. One very important reason is the greatly improved adherence between the glass coating and the base metal. The fact that the acid resistant glass can be fused to the sharp radii without resulting in spontaneous chipping makes it possible to do many things with these glass enameled alloy base metals which could not be done satisfactorily before, with mild steel.

It is now possible, for example, to carry a continuous homogeneous glass coating not only over the face of the flanged nozzle, but also to extend it over the outer edge of that nozzle. Users of glass lined processing equipment have desired such a structure for a long time. Prior to the present invention such equipment was not available.

Another new possibility is the complete and continuous coating of the external surfaces of cylindrical rods and angle bars made of the alloy; also glass enameled trays and other accessories for processing equipment have been made available as a result of the present invention.

One distinct advantage of using stainless steel or other suitable metal alloys as base metals for enameling is that these metal alloys, unlike mild steel, are practically impenetrable by atomic hydrogen. In other words, the hydrogen occlusion capacity of these metal alloys is very low in comparison to that of steel. This "impenetrability" of stainless steel toward hydrogen, coupled with less reaction gases being evolved at the firing temperature, makes the stainless steel or other metal alloy an excellent base metal for enameling. The danger of delayed enamel defects, such as fish scales or delayed chipping due to "hydrogen" defects, will be greatly diminished or completely avoided.

It is thus seen that the use of an alloy metal as a base metal for enameling has certain definite advantages over mild steel as follows:

(1) The alloy metal has better enameling properties. A lower volume of reaction gases evolves at the metal-enamel interface at the firing temperatures and hydrogen does not penetrate the metal alloy as readily as mild steel. This results in a coating with a better and stronger bond at the interface and with less enameling defects such as blistering, pitting and delayed chipping. All of these defects are closely related to the evolution of the reaction gases and hydrogen diffusion in the metal. This is particularly true when the metal is of such a thickness that the gases cannot escape through the metal and out through the uncoated surface, or when relatively thin gauge metals are coated or enameled on both sides.

(2) Many metal alloys have higher yield points than the yield point of mild steel. In the case of mild steel it is well known that the glass lining will fail when the base metal reaches the yield point. Alloy metals which have high yield points, when used as base metals for enamelling, have a glass coating stronger in mechanical strength and are able to withstand more severe mechanical stress under service conditions.

(3) If the base metal has proper corrosion resistance and is further protected by the glass lining, this system will afford maximum corrosion protection, for even if the glass lining has some pinholes, or some fine fractures develop later, the corrosion resistant base metal still withstands the corrosion attack for a long period of time. This feature affords safety and continuity of operation.

In accordance with the present invention, a metal alloy having chemical resistivity under operating conditions is lined with a suitable glass which will give added protection, increased safety, and a marked prolongation of the equipment life.

The present invention also deals with a method of fusing glass on different metals and metal alloys. This requires proper formulation of the glass to be used on a particular metal or metal alloy, due to different physical and chemical properties of different metal systems. In general, the glass to be used should have a lower linear thermal expansion than that of the metal. Too great a difference in the expansivities of the glass and the metal will, however, not be practical, because it will increase the danger of spontaneous chipping of the glass from the base metal.

It has been found that many metal alloys require a surface treatment different from, or in addition to, the conventional degreasing, sand blasting and/or acid bath treatment before they are subjected to the glass fusing process. For example, a controlled pre-oxidation of the metal surface promotes the application of and increases the adhesion of glass to the metal. With proper surface treatment, alloy metals afford a much stronger bond for glass than mild steel. Also in some instances a surface decarburization likewise improves the final product by decreasing the blistering and improving adherence.

On convex surfaces, the difference of expansivities of the glass and the metal should be small in order to minimize chipping. On the other hand, on concave or flat surfaces greater differences of the expansivities of the metal and the glass can be tolerated, and are beneficial. The residual stress so built up is compressive in nature and acts as a cushion against thermal shock and mechanical stress.

The invention will be described in connection with processing equipment of the above type for purposes of illustration. The accompanying drawings illustrate typical embodiments of the invention, in which:

FIG. 2 is a sectional view taken longitudinally through a portion of a container and its flange connections;

FIG. 3 is a longitudinal sectional view of the bottom outlet of said tank shown in FIG. 1, showing a continuous glass coating of an alloy metal, said coating extending continuously over the face of said nozzle and continuously extending over the sharp radii of the corners and around the edges of the nozzle.

FIG. 4 shows a portion of an agitator as shown in FIG. 1 having a glass enameled coat;

FIG. 6 is a top view of a glass coated tray taken on lines 6—6 of FIG. 5;

FIG. 7 is a sectional view, in elevation, of a portion of a turbo grid column showing Teflon shielded gaskets with portions of glass coated trays supported by Teflon insulated and glass coated supporting elements.

The present invention is capable of embodiment in a variety of adaptations and forms, several of which are herein disclosed by way of illustration of the preferred construction and method of making the same.

Figure 1:
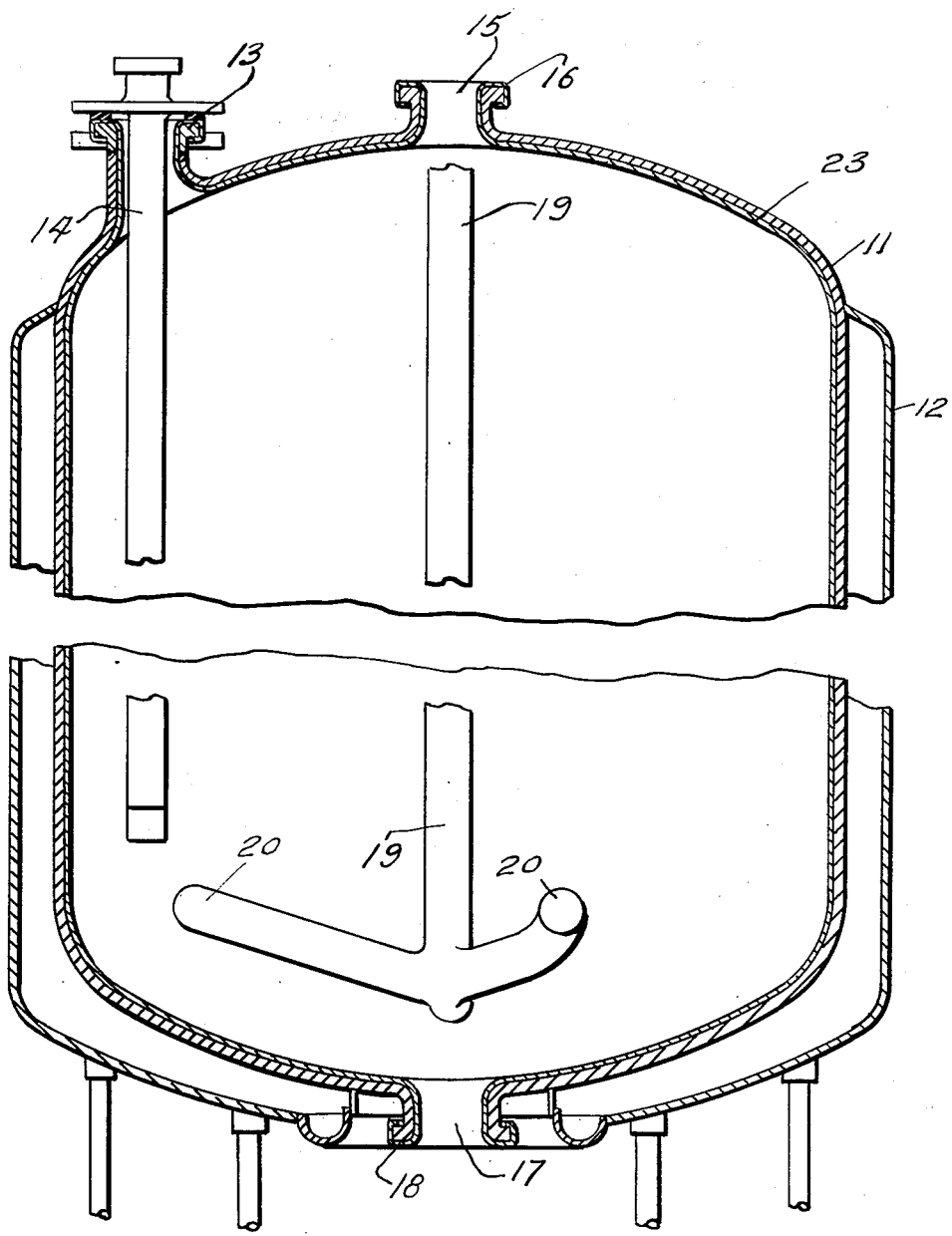
FIG. 1 is a sectional view, in elevation, taken diametrically through a glass lined processing tank and nozzle connections with parts broken away.

In FIG. 1 of the drawings, for example, a chemical processing tank having a main body portion 11 is shown, which may be made of an alloy metal or of mild steel, and having a jacket 12 which may be of alloy metal or mild steel. The numeral 13 represents an inlet nozzle of an alloy metal or mild steel. However, in the event that it is desired to continuously extend the glass enamel surface over the face of the nozzle and also over the outer edge around the sharp radii of the corners of the metal, it is necessary to use high alloy metals, as shown in the particular embodiment of FIG. 1. 14 represents a thermometer well which may be inserted through the inlet nozzle and held in place to record the temperatures within the vessel. An opening 15 for an agitator shaft is provided in the upper part of the vessel. Metal body 11 of the vessel, providing it is an alloy steel, may be glass coated continuously from the inner portion of the vessel on the face of the agitator shaft opening and around the edges, as shown at 16. An outlet opening 17 is provided in the bottom of the shaft. Here too, the metal of body 11 may be continuously enameled with glass as at 18, throughout the face of the outlet opening and around the small radii of the edges, providing that the enameled metal is an alloy metal. The agitator 19 and the thermometer well 14, along with the impeller 20 of the agitator may also be glass coated by means of the present invention.

In the embodiment of the invention shown in FIG. 2, the metal of the body 11 of the tank is mild steel, whereas the flange 13 which has sharp cornered radii is made of a high alloy such as Hastelloy F. The high alloy metal flange 13 of the inlet opening is welded to the collar 21 of the tank, as at 22, by means well known in the art. Continuous glass coating 23 is then applied by the methods to be described over the inner wall of the tank and is extended in a continuous manner about the face of flange 13 of the inlet opening and around the sharp corners of the metal to the lower edge 24 of the flange, as more particularly shown in FIG. 2.

FIG. 3 of the drawings shows another embodiment of the invention wherein the entire tank or vessel is made of a high alloy metal which is glass coated so that the flanges 25 of the outlet nozzle are continuously glass coated on their face and around the sharp radii of the edges so as to completely cover the entire edge of the flange 25.

FIG. 4 of the drawings shows a portion of the impeller and shaft 19 of an agitator which has been glass coated throughout the entire surface which comes in contact with corrosive material.

Figure 5:
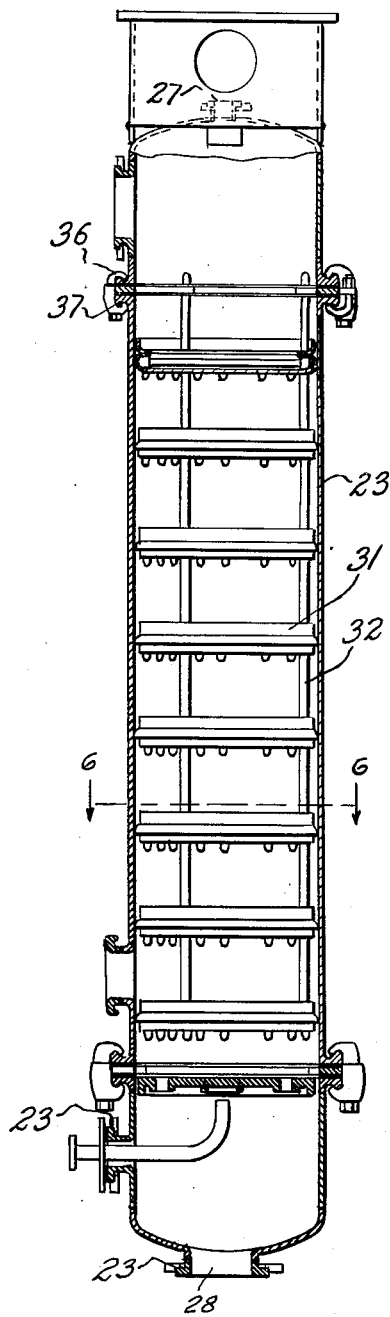
FIG. 5 is a sectional view, in elevation, taken diametrically through a glass lined turbo grid column showing the glass coated trays and glass coated tray supporting elements.

FIG. 5 of the drawing shows a further embodiment of our invention disclosing a turbogrid column which may be fabricated of mild steel or of alloy steel. As with the tanks shown in FIGS. 1, 2 and 3, if the outer shell is made of mild steel and it is desired to carry the glass coating over the edges of the inlet and outlet portions 27 and 28, it is necessary to weld high alloy flanges to the collars of the mild steel body of the turbogrid column.

There are disposed within the column trays as shown in FIG. 6, the outer supporting rims 29 which may be made of glassed metal alloy, although the rods 30 of the tray are usually made of Pyrex. Trays 31 are supported in place by rods 32 which are made of a glass coated high alloy metal. Attached to rods 32 are rod support rings 33, as shown in detail in FIG. 7. These support rings are also made of high alloy and are glass enameled. The rod support rings 33 are held in place by rods 32 and bumpers 34 made of Teflon. The rods are also held in place by means of glass enameled alloy spacer bars 35. The trays are further supported by clamps 36 held in position over the Teflon shielded gaskets 37, as particularly shown in FIG. 7. The rods are also held in position by clamp nuts 38 which are made of glassed alloy metal, and by alloy metal assembly nuts 39.

The following examples will serve to more fully illustrate the present invention.

*Example I*

A ground coat glass having a linear thermal expansion of $9.6 \times 10^{-6}$ per ° C., and having the following composition:

| | |
|---|---:|
| $SiO_2$ | 55.3 |
| $Al_2O_3$ | 6.0 |
| $B_2O_3$ | 13.0 |
| $Na_2O$ | 11.7 |
| $K_2O$ | 4.1 |
| $CaF_2$ | 7.7 |
| $CoO$ | 1.5 |
| $MnO_2$ | 0.7 |
| | 100.0 | is fused in a conventional electric or gas fired furnace to a base metal (Hastelloy C.), having the following formula:

| | |
|---|---:|
| C | .04–.15 |
| Cr | 13.0–16.0 |
| Ni | 54.5–59.5 |
| Mo | 15.0–19.0 |
| Fe | 4.0–7.0 |
| W | 3.5–5.5 | at temperatures of 1620–1640° F. A chemical reaction occurs between the glass and the alloy, altering the surface of the alloy so as to result in a bonding of the glass to the alloy.

To this ground coat a glass cover coat having a thermal expansivity of $8.3 \times 10^{-6}$ per ° C., and having the following composition:

| | |
|---|---:|
| $SiO_2$ | 54.0 |
| $Al_2O_3$ | 1.4 |
| $TiO_2$ | 12.3 |
| $Na_2O$ | 10.3 |
| $K_2O$ | 0.4 |
| $B_2O_3$ | 13.5 |
| $MgO$ | 1.1 |
| $SrO$ | 1.0 |
| $Na_3AlF_6$ | 5.5 |
| $CoO$ | 0.5 |
| | 100.0 | is fused at a temperature of from 1560° F. to 1600° F.

*Example II*

A ground coat glass having a thermal expansivity of $9.6 \times 10^{-6}$ per ° C., and having the following composition:

| | |
|---|---:|
| $SiO_2$ | 55.3 |
| $Al_2O_3$ | 6.0 |
| $B_2O_3$ | 13.0 |
| $Na_2O$ | 11.7 |
| $K_2O$ | 4.1 |
| $CaF_2$ | 7.7 |
| $CoO$ | 1.5 |
| $MnO_2$ | 0.7 |
| | 100.0 | is fused to a base metal (Hastelloy F.) having the following formula:

| | |
|---|---|
| Cr | 21.0–23.0. |
| Ni | 44.0–47.0. |
| Mo | 5.5–7.5. |
| Cb plus Ta | 1.75–2.5. |
| Ta | 0.50 minimum. |
| C | 0.08 maximum. |
| Mn | 1.0–2.0. |
| P | 0.04 maximum. |
| Si | 1.0 maximum. |
| W | Do. |
| Co | 2.5 maximum. |
| Cu | 0.15. |
| S | 0.03. |
| Fe | Balance. | at temperatures of 1620° to 1640° F. A chemical reaction occurs between the glass and the alloy, altering the surface of the alloy so as to result in a bonding of the glass to the metal.

To this ground coat a cover coat glass having a thermal expansivity of $8.3 \times 10^{-6}$ per ° C., and having the following composition:

| | |
|---|---:|
| $SiO_2$ | 54.0 |
| $Al_2O_3$ | 1.4 |
| $TiO_2$ | 12.3 |
| $Na_2O$ | 10.3 |
| $K_2O$ | 0.4 |
| $B_2O_3$ | 13.5 |
| $MgO$ | 1.1 |
| $SrO$ | 1.0 |
| $Na_3AlF_6$ | 5.5 |
| $CoO$ | 0.5 |
| | 100.0 | is fused at a temperature of from 1560° to 1600° F.

*Example III*

A ground coat glass having a thermal expansivity of $9.6 \times 10^{-6}$ per ° C., and having the following composition:

| | |
|---|---:|
| $SiO_2$ | 55.3 |
| $Al_2O_3$ | 6.0 |
| $B_2O_3$ | 13.0 |
| $Na_2O$ | 11.7 |
| $K_2O$ | 4.1 |
| $CaF_2$ | 7.7 |
| $CoO$ | 1.5 |
| $MnO_2$ | 0.7 |
| | 100.0 | is fused to base metal (Stainless Steel 430–T) having the following formula:

| | |
|---|---|
| Cr | .12 maximum. |
| Ti | 14.0–18.0. |
| C | 0.6–1.2 (5 to 10 times the carbon content). |
| Fe | Balance. | at temperatures of 1620° to 1640° F. A chemical reaction occurs between the glass and the steel, altering the surface of the steel so as to result in a fusion of the glass to the steel.

To this ground coat a cover coat glass having a thermal expansivity of $8.3 \times 10^{-6}$ per ° C., and having the following composition:

| | |
|---|---|
| $SiO_2$ | 54.0 |
| $Al_2O_3$ | 1.4 |
| $TiO_2$ | 12.3 |
| $Na_2O$ | 10.3 |
| $K_2O$ | 0.4 |
| $B_2O_3$ | 13.5 |
| MgO | 1.1 |
| SrO | 1.0 |
| $Na_3AlF_6$ | 5.5 |
| CoO | 0.5 |
| | 100.0 | is fused at a temperature of from 1560° to 1600° F.

Example IV

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.7 |
| $K_2O$ | 4.3 |
| $Al_2O_3$ | 6.4 |
| $CaF_2$ | 7.7 |
| CoO | 0.6 |
| $MnO_2$ | 0.7 |
| CuO | 1.0 |
| | 100.0 | is fused to base metal (Inconel) having the following formula:

| | |
|---|---|
| C | .08 |
| Cr | 13.0 |
| Ni | 79.5 |
| Fe | 6.5 | at a temperature of 1640° F. A chemical reaction occurs between the glass and the alloy, altering the surface of the alloy so as to result in a bonding of the glass to the alloy.

To this ground coat a cover coat glass having a thermal expansivity of $9.3 \times 10^{-6}$ per ° C., and having the following composition:

| | |
|---|---|
| $SiO_2$ | 54.2 |
| $Al_2O_3$ | 1.0 |
| $TiO_2$ | 14.8 |
| $Na_2O$ | 12.4 |
| $K_2O$ | 0.3 |
| $B_2O_3$ | 9.6 |
| MgO | 1.1 |
| ZnO | 0.6 |
| CaO | 0.6 |
| $Na_2AlF_6$ | 4.8 |
| CoO | 0.6 |
| | 100.0 | is fused at a temperature of from 1560° to 1600° F.

Example V

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.7 |
| $K_2O$ | 4.3 |
| $Al_2O_3$ | 6.4 |
| $CaF_2$ | 7.7 |
| CoO | 0.6 |
| $MnO_2$ | 0.7 |
| CuO | 1.0 |
| | 100.0 | is fused to a base metal (Stainless Steel 302) having the following formula:

| | |
|---|---|
| C | .08–.20. |
| Cr | 17.0–19.0. |
| Ni | 8.0–10.0. |
| Mn | 2.0 maximum. |
| Fe | Balance. | at a temperature of 1640° F. A chemical reaction occurs between the glass and the steel, altering the surface of the steel so as to result in a fusion of the glass and the steel.

To this ground coat a cover coat glass having a thermal expansivity of $9.3 \times 10^{-6}$ per ° C., and having the following composition:

| | |
|---|---|
| $SiO_2$ | 54.2 |
| $Al_2O_3$ | 1.0 |
| $TiO_2$ | 14.8 |
| $Na_2O$ | 12.4 |
| $K_2O$ | 0.3 |
| $B_2O_3$ | 9.6 |
| MgO | 1.1 |
| ZnO | 0.6 |
| CaO | 0.6 |
| $Na_2AlF_6$ | 4.8 |
| CoO | 0.6 |
| | 100.0 | is fused at a temperature of from 1560° to 1600° F.

Example VI

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.7 |
| $K_2O$ | 4.3 |
| $Al_2O_3$ | 6.4 |
| $CaF_2$ | 7.7 |
| CoO | 0.6 |
| $MnO_2$ | 0.7 |
| CuO | 1.0 |
| | 100.0 | is fused to a base metal (Stainless Steel 304) having the following formula:

| | |
|---|---|
| C | .08 maximum. |
| Cr | 18.0–20.0. |
| Ni | 8.0–11.0. |
| Mn | 2.0 maximum. |
| Fe | Balance. | at a temperature 1640° F. A chemical reaction occurs between the glass and the steel, altering the surface of the steel so as to result in a fusion of the glass and the steel.

To this ground coat a cover coat glass having the thermal expansivity of $9.3 \times 10^{-6}$ per ° C., and the following composition:

| | |
|---|---|
| $SiO_2$ | 54.2 |
| $Al_2O_3$ | 1.0 |
| $TiO_2$ | 14.8 |
| $Na_2O$ | 12.4 |
| $K_2O$ | 0.3 |
| $B_2O_3$ | 9.6 |
| MgO | 1.1 |
| ZnO | 0.6 |
| CaO | 0.6 |
| CoO | 0.6 |
| $Na_2AlF_6$ | 4.8 |
| | 100.0 | is fused at a temperature of from 1560° to 1600° F.

Example VII

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.7 |
| $K_2O$ | 4.3 |
| $Al_2O_3$ | 6.4 |
| $CaF_2$ | 7.7 |
| CoO | 0.6 |
| $MnO_2$ | 0.7 |
| CuO | 1.0 |
| | 100.0 | is fused to a base metal (Stainless Steel 316) having the following formula:

| | |
|---|---|
| C | .10 maximum. |
| Cr | 16.0–18.0. |
| Ni | 10.0–14.0. |
| Mo | 2.0–3.0. |
| Fe | Balance. | at a temperature of 1640° F. A chemical reaction occurs between the glass and the steel, altering the surface of the steel so as to result in a fusion of the glass and the steel.

To this ground coat a cover coat glass having a thermal expansivity of $9.3 \times 10^{-6}$ per ° C., and having the following composition:

| | |
|---|---|
| $SiO_2$ | 54.2 |
| $Al_2O_3$ | 1.0 |
| $TiO_2$ | 14.8 |
| $Na_2O$ | 12.4 |
| $K_2O$ | 0.3 |
| $B_2O_3$ | 9.6 |
| MgO | 1.1 |
| ZnO | 0.6 |
| CaO | 0.6 |
| $Na_2AlF_6$ | 4.8 |
| CoO | 0.6 |
| | 100.0 | is fused at a temperature of from 1560° to 1600° F.

Example VIII

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.7 |
| $K_2O$ | 4.3 |
| $CaF_2$ | 7.7 |
| $Al_2O_3$ | 6.4 |
| CoO | 0.6 |
| $MnO_2$ | 0.7 |
| CuO | 1.0 |
| | 100.0 | is fused to a base metal (Stainless Steel 347) having the following formula:

| | |
|---|---|
| C | 0.8 maximum. |
| Cr | 17.0–19.0. |
| Ni | 9.0–12.0. |
| Co | Ten times the carbon content. |
| Fe | Balance. | at a temperature of 1640° F. A chemical reaction occurs between the glass and the steel, altering the surface of the steel so as to result in a fusion of the glass and the steel.

To this ground coat a cover coat glass having a thermal expansivity of $9.3 \times 10^{-6}$ per ° C., and having the following composition:

| | |
|---|---|
| $SiO_2$ | 54.2 |
| $Al_2O_3$ | 1.0 |
| $TiO_2$ | 14.8 |
| $Na_2O$ | 12.4 |
| $K_2O$ | 0.3 |
| $B_2O_3$ | 9.6 |
| MgO | 1.1 |
| ZnO | 0.6 |
| CaO | 0.6 |
| $Na_2AlF_6$ | 4.8 |
| CoO | 0.6 |
| | 100.0 | is fused at a temperature of from 1560° to 1600° F.

Example IX

A ground coat glass having a thermal expansivity of $11.5 \times 10^{-6}$ per ° C., and having the following composition:

| | |
|---|---|
| $SiO_2$ | 48.6 |
| $B_2O_3$ | 13.0 |
| $Na_2O$ | 17.0 |
| $K_2O$ | 4.3 |
| $CaF_2$ | 7.7 |
| $Al_2O_3$ | 6.4 |
| CoO | 0.6 |
| $MnO_2$ | 0.7 |
| CuO | 1.0 |
| | 99.3 | is fused to a base metal (Stainless Steel 321) having the following formula:

| | |
|---|---|
| C | .08. |
| Cr | 17.0–19.0. |
| Ni | 8.0–11.0. |
| Ti | Minimum 5 times the carbon content. |
| Fe | Balance. | at a temperature of 1640° F. A chemical reaction occurs between the glass and the steel, altering the surface of the steel so as to result in a fusion of the glass and the steel.

To this ground coat a cover coat glass having a thermal expansivity of $9.3 \times 10^{-6}$ per ° C., and having the following composition:

| | |
|---|---|
| $SiO_2$ | 54.2 |
| $Al_2O_3$ | 1.0 |
| $TiO_2$ | 14.8 |
| $Na_2$ | 12.4 |
| $K_2O$ | 0.3 |
| $B_2O_3$ | 9.6 |
| MgO | 1.1 |
| ZnO | 0.6 |
| CaO | 0.6 |
| $Na_2AlF_6$ | 4.8 |
| CoO | 0.6 |
| | 100.0 | is fused at a temperature of from 1560° to 1600° F.

A satisfactory ground coat is one designed to give good adherence. As the enameler will understand, the ground coat frit is milled with water to form a slip and then applied to the article in any suitable way, spraying being an excellent mode of obtaining uniformly thin coatings. Similarly, the frit for the cover coat is milled with water, opacifier and clay to form a slip and is applied over the ground coat.

Other conventional methods well known in the art may be used, such as the application of cover coats by a hot dusting process. In general, the hot dusting process requires a fewer number of coats than the wet process.

The use of high alloy metal renders unnecessary the thicknesses of ground coating heretofore found necessary to take care of metal oxidation and attendant difficulties. It is only necessary to use sufficient ground coat to obtain the desired adhesion. While the thinnest ground coat which will give adherence is preferred for maximum resistance to chipping, a total thickness of the coating of chemical glass which possesses the ability to withstand 1,000 volts or higher, as tested by a Cesco high frequency tester, is desirable. The application of thinner coats yields improved physical properties.

As used herein, the term "chemical glass" is a glass which will withstand corrosion of alkalis up to pH 12 at temperatures up to 212° F.; and of acids, other than hydrofluoric, at higher temperatures.

The values of the coefficient of expansion for glass represent the average coefficient values in the temperature ranges between 25° C.–400° C.

The present invention may also be employed in the enameling of welded joints as well as continuous surfaces.

In the glass lining process, one ground coat is usually applied first with one or more cover coats applied to such ground coat to form a continuous coating free from pin holes. However, some equipment can be made by the application of only one coating to the base alloy metal.

In addition, as shown in the examples, the glass coating can also be fused to a metal or alloy surface which has been bonded to ordinary carbon steel by one of the following methods:

(a) An alloy sheet cladded to carbon steel by rolling or pressing at elevated temperatures
(b) A metallic coating such as nickel or chromium deposited by electrolytic, chemical, or powder spraying process with proper heat treatment, under controlled gaseous atmosphere, if necessary.

In general, the firing temperatures employed in the process range between 1200° and 1700° F., but firing temperatures higher than 1700° F. can be used on heat resistant alloy base metals.

The glasses employed in the present invention have coefficients of linear thermal expansion from $4 \times 10^{-6}$ to $13 \times 10^{-6}$ per degree of centigrade, in the temperature range 25–400° centigrade, and moduli of elasticity from $8.5 \times 10^{-6}$ to $12.5 \times 10^{-6}$ pounds per square inch. Such glasses have been fused to metals or alloys, in thicknesses greater than .004 inch of glass, the metal or alloy having a linear thermal expansion between $9.0 \times 10^{-6}$ per degree centigrade to $18.0 \times 10^{-6}$ per degree centigrade, in the temperature range of 0° to 300° C. As noted above, the metal or alloy must have a slightly higher coefficient of linear thermal expansion than the glasses employed. Thus the range of differences which we have found to be operable with respect to the linear thermal expansion fall within $0.1 \times 10^{-6}$ per degree centigrade to $8.0 \times 10^{-6}$ per degree centigrade. Consequently, Hastelloy C, Hastelloy F, and Stainless Steel 430–T may be successfully coated with ground coat glasses having expansivities of about $9.6 \times 10^{-6}$ per degree centigrade. Cover coats having a lower expansivity may then be applied.

It is desirable that the glass or enamel coating of the present invention be of the order of upwards of .004 inch in thickness in order to give the desired non-porous continuous surface, which will resist the corrosive conditions to which the equipment as set forth herein is subjected.

The present invention has many advantages over the prior art. The resistance to chemical, mechanical, and thermal shock is greatly improved. On alloy metal surfaces there are less reaction gases such as carbon monoxide and hydrogen. This results in a stronger bond between glass and metal and fewer coating defects. Further, atomic hydrogen does not diffuse through the metal alloy readily. Less scaling or oxidation of alloy metals at the firing temperature occurs. It has been found that excessive scaling during the firing operation reduces the bond between the glass and the metal. This makes possible the use of more refractory glasses, which fire on at higher temperatures, and which have better physical and chemical properties than the lower melting glasses. High temperature strength of the alloy metals is better than that of mild steel; therefore warping and deformation of the alloy metals at high temperatures is less than that of mild steel. These are contributing factors to the better strength of glass linings on alloy steel. Because of this better mechanical strength, glass lined alloy metals may be glassed over very small radii, yet chipping of the glass is avoided.

The materials of the present invention were found superior to glassed mild steel with respect to mechanical shock by the techniques and methods as set forth in the "Proceedings of the Thirteenth Annual Porcelain Enamel Institute Forum," October 1951, page 52.

By using methods and equipment as described in "Better Enameling," December 1951, page 16, it was determined that the glassed metal alloys described herein possessed non-porous, continuous surfaces. We have found that glassed metal alloys possessing the ability to withstand 1,000 volts, or higher, as tested by a Cesco high frequency tester, are suitable for our purpose.

As used herein, the following terms and phrases have the meanings indicated:

The phrase "corrosion-resistant" means resistance to corrosion both from organic and mineral acids at boiling temperatures.

The term "alloy" and the phrase "metal alloy" mean high temperature alloys, other than mild steel, or carbon steel. Such alloys will not oxidize excessively at the firing temperatures and have good strength at such enameling temperatures.

The term "thermal expansion" in all instances means linear thermal expansion.

While we have described our invention in terms of specific embodiments, such as chemical processing tanks, jacketed reactors and stills and accessories therefor, and turbogrid columns, it will be obvious to those skilled in the art that many other applications are possible. In general, the glassed metal corrosion resistant materials disclosed herein are applicable to all types of processing equipment wherein corrosive materials are handled, such as pumps, particularly the blades, impeller, housing and shaft of pumps which are subject to high corrosive action; valves; tie-rods; weirs; screens; perforated plates; filters; ground glass rotary seals; dryers; towers; storage tanks; coolers; compressors; condensers; screw conveyors; centrifuges; crystallizers; flotation machines; magnetic separators; clarification systems; thickening systems; dust and mist collectors, where corrosive materials are involved; extruders; concentrators; rolls for galvanizing; grinding mills; flakers; emulsification equipment; colloid mills; sprayers, particularly the nozzles of sprayers; pelleting, tableting and briquetting equipment; flocculators; mixers; including flow mixers, paddle or arm mixers, propeller or helical mixers, and turbine or centrifugal-impeller mixers. While it is particularly applicable to equipment involved in high pressure techniques, it is also useful in all material-handling where corrosive materials are involved. For example, feeders and feeding mechanisms and storage containers may be constructed in part or completely with the materials of the present invention. The invention has particular application to those portions of such equipment and to accessories therefor where the shape of the equipment involves sharp radii.

It will be apparent that many variations and modifications may be made in practicing the present invention.

Broadly, the invention comprehends the production of glassed metals highly resistant to chemical attack, thermal shock, and mechanical stress, having an improved structure substantially free of blisters, pinholes, and fish scaling, by fusing a suitable enameling glass to a metal or alloy having a higher expansivity.

We claim:

1. A material of construction resistant to chemical attack, corrosion, mechanical shock and thermal shock, comprising a non-porous continuous surface of chemical glass having a thickness in excess of .004 inch, fused to a metal alloy, said metal alloy having a higher coefficient of thermal expansion than said glass.

2. A material of construction resistant to chemical attack, corrosion, mechanical shock and thermal shock, comprising a non-porous continuous surface of chemical glass, having a thickness of at least .004 inch, and a coefficient of linear thermal expansivity within the range of $4.0 \times 10^{-6}$ per degree of centigrade to $13.0 \times 10^{-6}$ per degree of centigrade, fused to a metal alloy having a coefficient of linear thermal expansivity within the range of $9.5 \times 10^{-6}$ per degree of centigrade to $18.0 \times 10^{-6}$ per degree of centigrade, said metal alloy having a higher coefficient of thermal expansivity than said glass.

References Cited in the file of this patent

UNITED STATES PATENTS

| | | |
|---|---|---|
| 835,078 | Nathan | Nov. 6, 1906 |
| 2,001,725 | Harris | May 21, 1935 |
| 2,057,254 | Sommer | Oct. 13, 1936 |
| 2,347,070 | Austin | Apr. 18, 1944 |
| 2,356,047 | Geisinger et al. | Aug. 15, 1944 |

FOREIGN PATENTS

| | | |
|---|---|---|
| 334,320 | Italy | Jan. 24, 1936 |

OTHER REFERENCES

The Glascote Company, "Glascote Chemical Equipment," 1925, pages 4, 5, 7 and 9.